United States Patent [19]

Miyasaka et al.

[11] Patent Number: 4,964,010
[45] Date of Patent: Oct. 16, 1990

[54] APPARATUS FOR LIMITING A TIME INTEGRATION VALUE OF A PULSED CURRENT

[75] Inventors: Katsuyuki Miyasaka, 35-31, Taishido 3-chome, Setagaya-ku, Tokyo; Takuo Aoyagi, Tokyo, both of Japan

[73] Assignees: Katsuyuki Miyasaka; Nihon Kohden Corporation, both of Tokyo, Japan

[21] Appl. No.: 437,301

[22] Filed: Nov. 16, 1989

Related U.S. Application Data

[63] Continuation of Ser. No. 201,152, Jun. 2, 1988, abandoned.

[30] Foreign Application Priority Data

Jun. 5, 1987 [JP] Japan ................................. 62-141233

[51] Int. Cl.$^5$ ............................................. G05F 1/00
[52] U.S. Cl. ..................................... 361/18; 323/278; 323/284; 372/25; 372/38
[58] Field of Search ................. 361/18, 152, 153, 154; 323/275, 276, 277, 278, 282, 284; 128/724, 726; 307/270, 311, 359; 372/25, 38

[56] References Cited

U.S. PATENT DOCUMENTS

| 4,332,256 | 6/1982 | Brownlee et al. | 128/419 PT |
|---|---|---|---|
| 4,345,201 | 8/1982 | Thompson et al. | 324/524 |
| 4,489,415 | 12/1984 | Jones, Jr. | 372/38 |
| 4,507,543 | 3/1985 | Ukai et al. | 219/125.12 |
| 4,612,610 | 9/1986 | Farnsworth et al. | 363/19 |
| 4,724,835 | 2/1988 | Liss et al. | 372/38 |
| 4,771,431 | 9/1988 | Nakazawa et al. | 372/38 |
| 4,787,087 | 11/1988 | Hashimoto et al. | 372/38 |

FOREIGN PATENT DOCUMENTS 0173155 3/1986 European Pat. Off. .
3146327 6/1983 Fed. Rep. of Germany .

OTHER PUBLICATIONS

Review of Scientific Instruments, vol. 54, No. 12, Dec., 1983, N.Y., N.Y., U.S.A., pp. 1795–1796: Mikio Yamashita, "Temperature Compensating Pulsed Reference Light Source Using a LED".

Primary Examiner—A. D. Pellinen
Assistant Examiner—Jeffrey A. Gaffin
Attorney, Agent, or Firm—Sughrue, Mion, Zinn, Macpeak & Seas

[57] ABSTRACT

An electronic device including a circuit element to which a pulse current is applied, and a device for limiting the time integration value of current flowing in the circuit element, the device being connected in series to the circuit element, to prevent the circuit element from being overheated.

8 Claims, 3 Drawing Sheets 4,964,010

APPARATUS FOR LIMITING A TIME INTEGRATION VALUE OF A PULSED CURRENT

This is a continuation of application Ser. No. 07/201,152 filed June 2, 1988 now abandoned.

BACKGROUND OF THE INVENTION

1. Field of the Invention

This invention relates to an improvement of an electronic device in which a pulse current flows in a circuit element such as a LED (light emitting diode) or thermistor.

2. Prior Art

One example of a conventional electronic device of this type is a pulse oximeter. The pulse oximeter generally uses an LED. In order to increase the quantity of light of the LED, it is essential to increase the current flowing therein. However, the steady application of large current to the LED suffers from the following difficulties: Heat generated by the LED, (1) lowers the efficiency of the LED itself, (2) thermally damages the LED, and (3) damages vital tissues adjacent to the LED. Accordingly, when a large current is applied to the LED, it should be in the form of a pulse. However, it should be noted that, if the circuit is modified so as to apply a large current, in the form of a pulse to an LED, which becomes out of order (i.e., allows a large current to continuously flow in the LED), then the circuit will suffer from the same difficulties.

As was described above, when the conventional pulse oximeter becomes out of order to cause current, to continuously flow in the LED, the latter is overheated. However, the conventional pulse oximeter has no means for eliminating or preventing this difficulty. Only the pulse oximeter with the LED has been described; however, the preceding description is applicable to electronic devices having a circuit element which is driven by a pulse current and which should be prevented from being overheated.

SUMMARY OF THE INVENTION

Accordingly, an object of the invention is to provide an electronic device with a circuit element to which a pulse current is applied, in which the circuit element is prevented from being overheated.

The foregoing object and other objects of the invention have been achieved by the provision of an electronic device in which a pulse current flows in a circuit element, which according to the invention, comprises: means for limiting the time integration value of current flowing in the circuit element, the means being connected in series to the circuit element.

The nature, principle and utility of the invention will become more apparent from the following detailed description and the appended claims when read in conjunction with the accompanying drawings.

DETAILED DESCRIPTION OF THE PREFERRED EMBODIMENTS

Preferred embodiments of this invention will be described with reference to the accompanying drawings.

Figure 1:
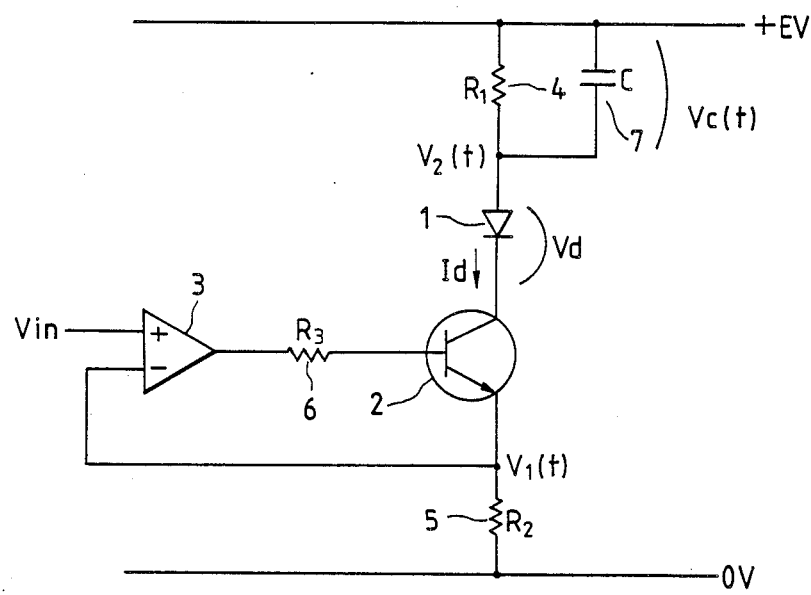
FIG. 1 is a circuit diagram showing a first embodiment of the invention.

FIG. 1 shows a circuit around an LED in a pulse oximeter according to the invention. In FIG. 1, reference numeral 1 designates the LED; 2, a transistor 3, an operational amplifier; 4, 5 and 6, resistors; and 7, a capacitor. The anode of the LED 1 is connected to one connecting point of the resistor 4 and the capacitor 7. A constant voltage $+E$ (V) is applied to the other connecting point of the resistor 4 and the capacitor 7. The cathode of the LED 1 is connected to the collector of the transistor 2. The base of the transistor 2 is connected through the resistor 6 to the output terminal of the operational amplifier 3, and the emitter is connected to the inversion input terminal $(-)$ of the operational amplifier 3 and to one terminal of the resistor 5, the other terminal of which is held at 0 volt. A drive signal voltage $V_{in}(t)$ is applied to the non-inversion input terminal $(+)$ of the operational amplifier 3.

In the circuit thus organized, the parallel circuit of the resistor 4 and the capacitor 7 is a means for limiting the time integration value of current flowing in the LED 1.

The operation of the circuit shown in FIG. 1 will be described with reference to FIGS. 3 and 4. In this connection, the voltage drop across the parallel circuit of the resistor 4 and the capacitor 7 is represented by $V_c(t)$; the voltage drop in the forward direction of the LED 1, $V_d(t)$; the Current flowing in the LED 1, $I_d(t)$; the voltage at the connecting point of the emitter of the transistor 2 and the resistor 5, $V_1(t)$; the voltage at the anode of the LED 1, $V_2(t)$; the resistances of the resistors 4, 5 and 6, $R_1$, $R_2$ and $R_3$, respectively; and the capacitance of the capacitor 7, C.

Figure 3:
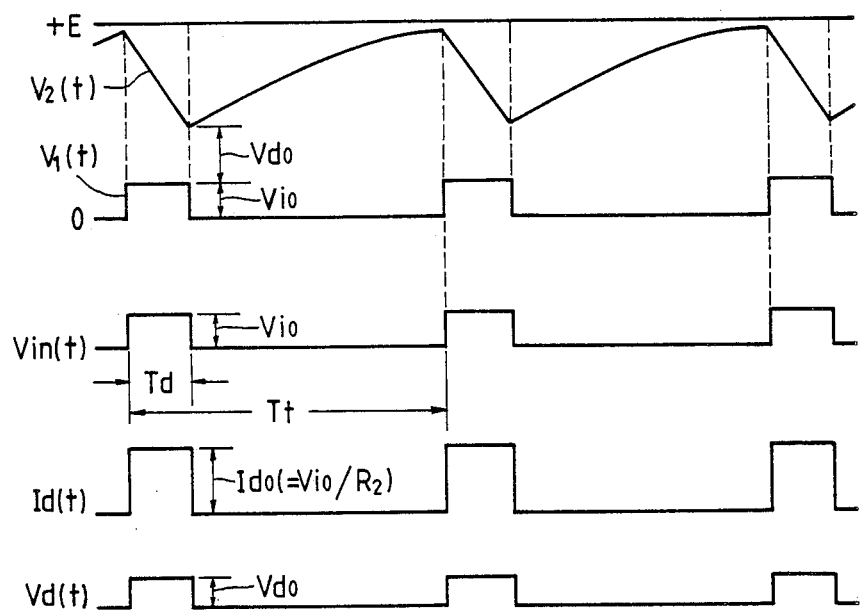
FIGS. 3 and 4 are time charts for a description of the operation of the circuit shown in FIG. 1.

FIG. 3 shows relationships between $V_1(t)$, $V_2(t)$, $I_d(t)$ and $V_d(t)$ in the case where the drive signal $V_{in}(t)$ is normal (i.e., not out of order). As is apparent from FIG. 3, in the case where the drive signal $V_{ni}(t)$ is a pulse wave $V_{io}$ in peak value, $T_d$ in pulse width and $T_t$ in period, the voltage $V(t)$ changes with charge and discharge of the capacitor 7; however, the current $I_d(t)$ flowing in the LED 2 is a pulse wave synchronous with the pulse wave $V_{ni}(t)$, not depending on the value $V_2(t)$. The peak value Ido of the current $I_d(t)$ is $V_{in}/R_2$.

Figure 2:
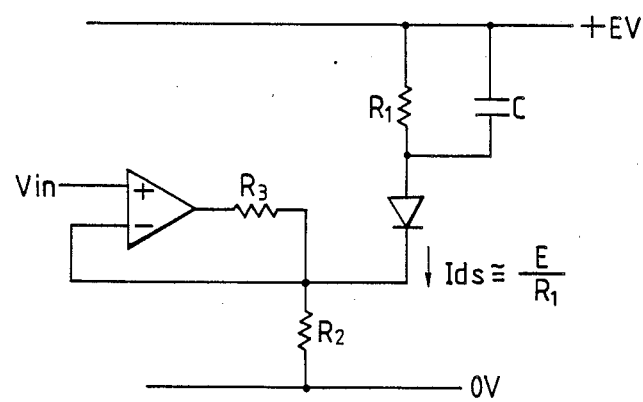
FIG. 2 is a circuit diagram showing an equivalent circuit of the circuit of FIG. 1 which is placed in a certain state.
Figure 4:
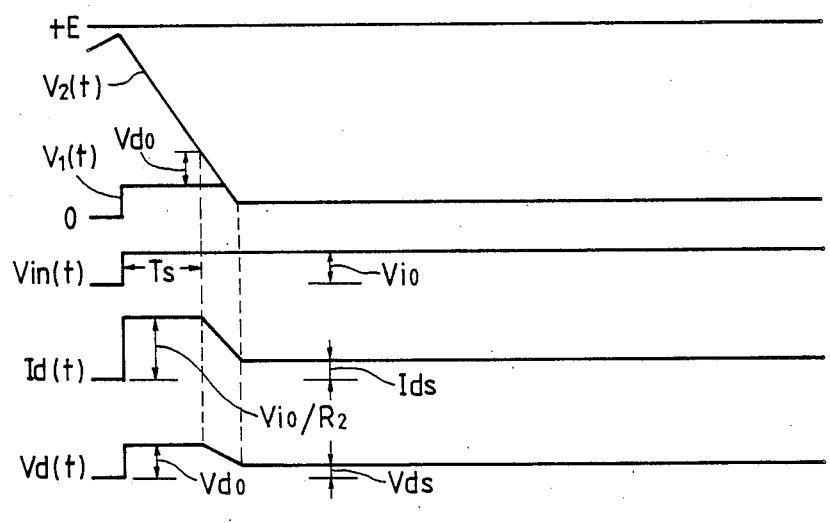

FIG. 4 shows relationships between $V_1(t)$, $V_2(t)$, $I_d(t)$ and $V_d(t)$ in the case where the drive signal $V_{ni}(t)$ is abnormal (i.e., out of order), thus being held at $V_{io}$ for more than a predetermined period of time $T_s$. The voltage $V_2(t)$ becomes equal to $(V_1(t)=Vdo)$ when the drive signal voltage $V_{ni}(t)$ reaches $V_{io}$, for a period of time $T_s$. In this case, the difference between the base voltage and the collector voltage of the transistor 2 becomes zero, and the transistor 2 is saturated, thus losing its current amplifying function. From this time instant, (i.e., from the time $V_{in}(t)$ reaches Vio for a period of time $T_s$) the current $I_d(t)$ flowing in the LED 1 decreases, and after the lapse of a predetermined period of time the circuit of FIG. 1 becomes equivalent to that shown in FIG. 2. That is, the current $I_d(t)$ is held stable with $I_{ds} \approx E/R_1$. The circuit of FIG. 1 is so designated that $V_{io}/R_2 > E/R_1$ is established. Therefore, even if the drive signal $V_{ni}(t)$ becomes abnormal or out of order as described above, the predetermined period of time after it is raised to $V_{io}$ the current $I_d(t)$ is maintained at a substantially small value $E/R_1$, and therefore the LED 1 will never be overheated.

As is apparent from the above description, the embodiment of the invention is formed by adding the passive circuit element to the original drive circuit for driving a predetermined circuit element, and therefore it scarcely becomes out of order. That is, the electronic device provided by the invention is high in reliability.

One example of the medical instruments to which the technical concept of the invention is applicable is a thermistor thermometer.

The thermistor thermometer is used not only to measure a body temperature, but also to detect the number of respirations per unitary time. In the latter case, the thermistor thermometer is inserted into the nostril, so that the temperature difference between inhalation and exhalation. The operating principle of the thermistor thermometor is that current is applied to the thermistor so that the resistance of the thermistor which changes with temperature is detected as a variation in voltage. The sensitivity of measurement can be improved by increasing the amount of current applied to the thermistor; however, the method is disadvantageous in that the current thus increased raises the temperature of the thermistor element, resulting in an error in measurement. In order to eliminate this difficulty, a thermistor thermometer in which a pulse current is utilized to drive the thermistor element has been proposed. The technical concept of this invention may be applied to the thermistor thermometer thus proposed. That is, in this case, the means for limiting the time integration value of current is connected in series to the thermistor element therein. Therefore, even when the pulse current generating circuit or the like becomes out of order to allow the application of excessively large current, the trouble that the thermistor element is broken or the patient gets burned will never take place.

Figure 5:
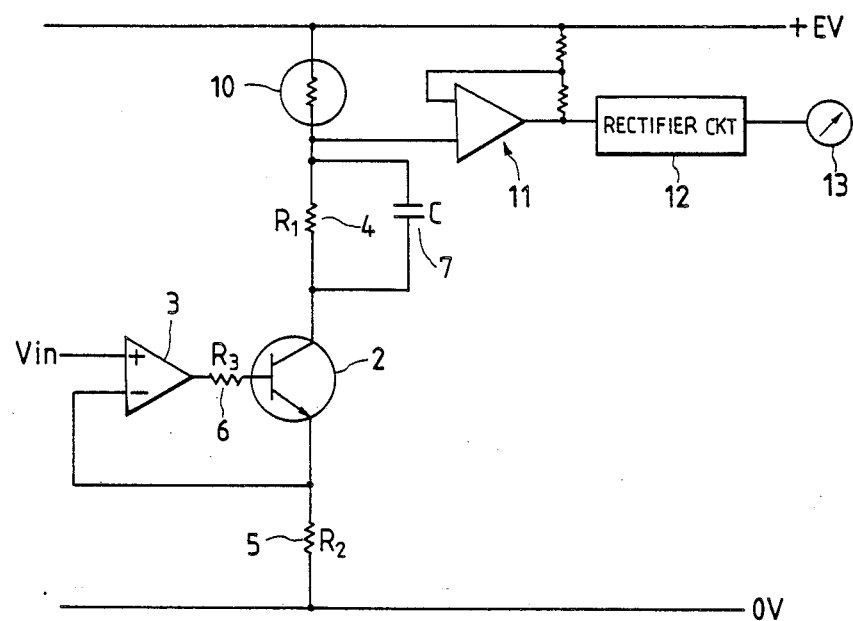
FIG. 5 is a circuit diagram showing another embodiment of this invention.

FIG. 5 shows one example of a circuit in which the thermistor thermometer is employed as a respiration monitor. In FIG. 5, reference numeral 10 designates a thermistor; 11, an amplifier for detecting and amplifying a voltage developed across the thermistor 10; 12, a rectifier circuit for rectifying the output of the amplifier 11; and 13, a meter for indicating the output value of the rectifier circuit 12. The other circuit elements are the same as those in FIG. 1, being designated by the same reference numerals. In FIG. 5, the parallel circuit of the resistor 4 and the capacitor 7 is the means for limiting the time integration value of current flowing in the thermistor 10. Even when, in the circuit thus organized, the drive signal becomes abnormal. The thermistor 10 will never be overheated.

As was described above, when an abnormal drive signal is applied to the device to allow current to flow in the circuit element for more than the predetermined period of time to which a pulse current is normally applied, the current is limited according to the invention so that the circuit element is prevented from being overheated. Accordingly, the device is prevented from damage, and can be applied to the living body with higher security.

What is claimed is:

1. An electronic device, comprising:
   a circuit element;
   means for supplying a pulse current to said circuit element;
   means for supplying a constant current to said circuit element when a time integration value of the pulse current exceeds a predetermined value;
   wherein said circuit element is a light emitting diode having an anode and a cathode; and
   wherein said pulse current supplying means and said constant current supplying means together comprise a constant voltage source, a capacitor connected between said constant voltage source and the anode of said light emitting diode, a transistor having a base, a collector and an emitter, the collector being connected to said light emitting diode, and drive means for supplying a drive pulse current to the base of said transistor, whereby said transistor becomes saturated when the time integrated value of the pulse current supplied to said light emitting diode exceeds the predetermined value.

2. The electronic device as defined in claim 1, further comprising a resistor connected in parallel with said capacitor.

3. The electronic device as defined in claim 1, wherein said drive means comprises a differential amplifier having a positive terminal for receiving a pulse input signal and a negative terminal connected to the emitter of said transistor.

4. An electronic device, comprising:
   a circuit element;
   means for supplying a pulse current to said circuit element;
   means for supplying a constant current to said circuit element when a time integration value of the pulse current exceeds a predetermined value;
   wherein said circuit element is a thermistor having first and second connection terminals; and
   wherein said supplying means comprises a constant voltage source, a capacitor connected between said constant voltage source and the first connection terminal of said thermistor, a transistor having a base, a collector and an emitter, the collector being connected to the second connection terminal of said thermistor, and drive means for supplying a pulse drive signal to the base of said transistor, whereby said transistor becomes saturated when the time integrated value of the pulse current supplied to said thermistor exceeds the predetermined value.

5. An electronic device, comprising:
   an LED;
   a parallel circuit comprising a resistor and a capacitor connected in parallel with each other;
   a constant voltage source;
   a transistor for supplying a pulse current to said LED; and
   drive means for supplying a pulse current to the base of said transistor;
   said LED and said parallel circuit being connected in series with each other between said constant voltage source and said transistor;
   the voltage across said parallel circuit representing a time integration value of the pulse current, and the output of said transistor saturates when the time integrated value of the pulse current supplied to said LED exceeds a predetermined value, thereby limiting the current supplied to the transistor, and preventing said LED from over-heating.

6. An electronic device as claimed in claim 5, wherein said drive means comprises a differential amplifier having a positive terminal for receiving a pulse input signal, and a negative terminal connected to the emitter of said transistor.

7. An electronic device, comprising:
   a thermistor;
   a parallel circuit comprising a resistor and a capacitor connected in parallel with each other;
   a constant voltage source;
   a transistor for supplying a pulse current to said thermister; and
   drive means for supplying a drive pulse current to the base of said transistor;
   said thermistor and said parallel circuit being connected in series with each other between said constant voltage source and said transistor;
   the voltage across said parallel circuit representing a time integration value of the pulse current;
   the output of said transistor saturating when the time integrated value of the pulse current supplied to said thermistor exceeds a predetermined value, thereby preventing said thermistor from over-heating.

8. An electronic device as claimed in claim 7, wherein said drive means comprises a differential amplifier having a positive terminal for receiving a pulse input signal and a negative terminal connected to the emitter of said transistor.

* * * * *